April 6, 1943. W. H. BAGLEY, JR 2,316,119
BEARING
Original Filed Dec. 12, 1936
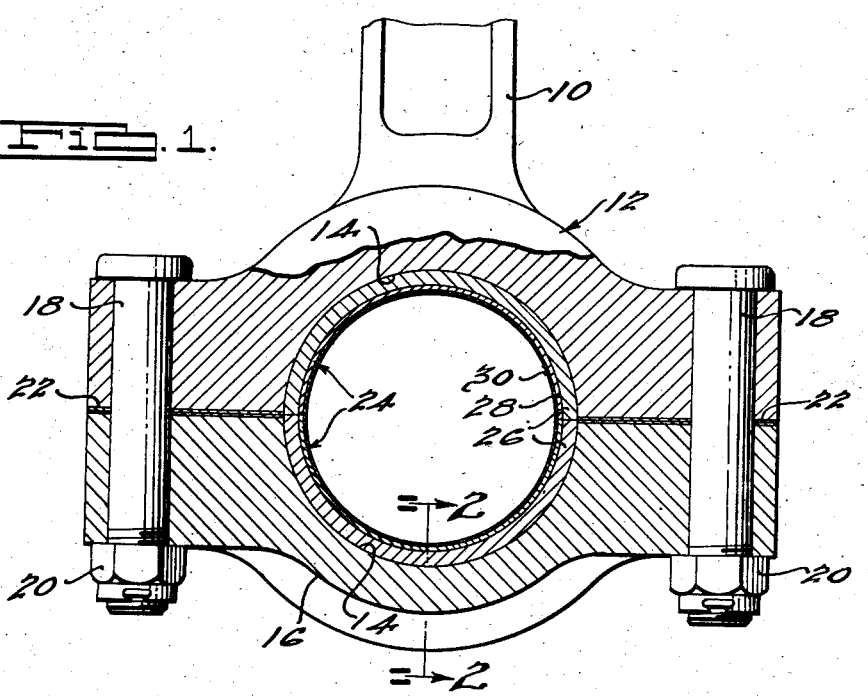
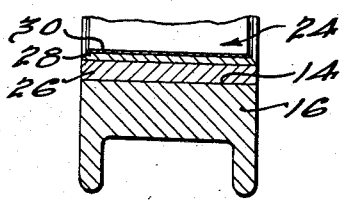
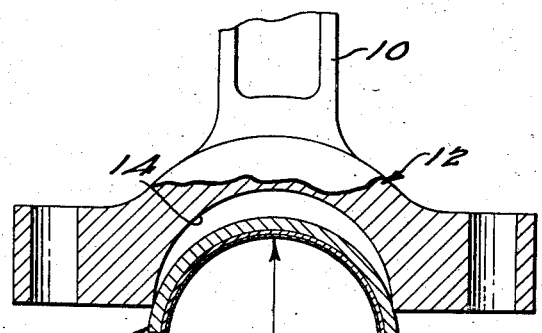
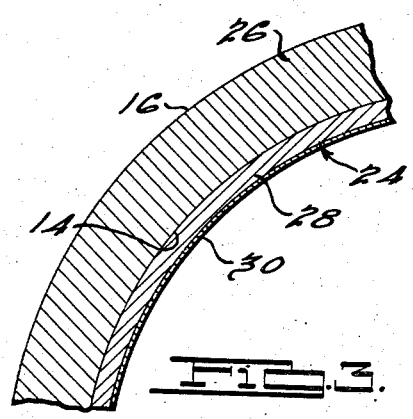
INVENTOR
William Harold Bagley, Jr.
BY Harness, Dickey & Pierce
ATTORNEYS.

Patented Apr. 6, 1943

2,316,119

UNITED STATES PATENT OFFICE 2,316,119

BEARING

William Harold Bagley, Jr., Detroit, Mich., assignor to Electro Bearing Company, Detroit, Mich., a corporation of Michigan Substituted for abandoned application Serial No. 115,560, December 12, 1936. This application August 14, 1939, Serial No. 290,007

7 Claims. (Cl. 308—237)

This invention relates to bearings and particularly to the so-called "shell type" of bearing of the type commonly employed in connection with internal combustion engines in accordance with present day practices, the principal object being the provision of an improved bearing of the type described. It is a substitute for abandoned application on the same subject filed December 12, 1936, and serially numbered 115,560.

Other objects of the invention include the provision of replaceable shell type bearings having an inherent relatively greater amount of flexibility than found in present day practice; the provision of a bearing of the type described having a sufficient amount of inherent flexibility to permit it to be repeatedly distorted in service without affecting the structure and operability thereof; the provision of a bearing of the type described unusually resistant to pounding out of the bearing surface thereof under severe operating conditions; the provision of a bearing of the type described that eliminates the occurrence of localized hot spots in the surface area thereof; and the provision of a high quality bearing of the type described that is unusually economical to produce.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Figure 1 is a fragmentary, partially broken, partially sectioned, side elevational view of the big end of a connecting rod for an internal combustion engine, illustrating the application of a bearing constructed in accordance with the present invention thereto;

Fig. 2 is a fragmentary, transverse sectional view taken on the line 2—2 of Fig. 1;

Fig. 3 is an enlarged, fragmentary, sectional view taken through a portion of the bearing illustrated in Fig. 2 as on the line 3—3 thereof; and Fig. 4 is a more or less diagrammatic, fragmentary, partially broken, partially sectioned, side elevational view of the large end of a connecting rod with the cap thereof removed, illustrating the relation of the bearing half in respect thereto during the process of assembling the same thereto.

In modern high speed types of internal combustion engines, the main bearings for the engine, and particularly those for the crank shaft and the big ends of the connecting rods, are of the so-called "shell" type. In other words, the bearings are made in the form of a split cylindrical shell, each half of which is substantially semi-cylindrical in conformation. The engine crank case is provided with suitable bearing supports, each provided with a removable cap, providing a cylindrical bore for the reception of the bearing shells for the main journals of the crankshaft, and the big end of each connecting rod is provided with a removable cap and provides a similar cylindrical opening for reception of the bearing shells for the crank pin. The bearing shells, or as more conventionally known, the bearings, are formed entirely independently of the parts adapted to support them in service and are simply assembled thereto during manufacture and/or repair of the engine.

Modern day practice demands, particularly for automotive vehicles of the pleasure type and for airplanes, internal combustion engines of minimum weight and vibration and accordingly, particularly the rotating and/or the reciprocating parts of the engine are constructed as lightly as is feasible according to good engineering practice. In present high-speed engines considerable difficulty has been encountered in bearing failures.

Many factors enter into these failures, but among the chief reasons are excessive pressures, high temperatures, and flexing of the bearing. Connecting rods of internal combustion engines in particular and particularly the lower or big ends thereof are subjected to relatively enormous stresses at high engine speeds and particularly at the moments at which the corresponding pistons are at approximately top and bottom dead center positions, due particularly to the tremendous forces necessary to reverse direction of reciprocation of the corresponding piston, piston pin, and the remaining portion of the connecting rod. These forces are of such great magnitude, particularly at high engine speeds as to tend to and actually cause a distortion of the lower end of the connecting rod and the bearing carried thereby. While the distortion of the bearing under certain such circumstances may be relatively small, as for instance a distortion of the bearing a thousandth of an inch or less out of its true cylindrical conformation, nevertheless it has been shown that repeated flexing of the bearing in the direction of the maximum forces acting upon the corresponding rod because of this effect, causes the bearing to first fail over those areas thereof immediately adjacent the longitudinal center line of the connecting rod.

In the past, automobile bearings were cast into the rod and machined out. Generally, a thick layer of babbitt was used. Because of the thickness used, the bearings often failed. The failures were generally due to pounding out, or the breaking out of the babbitt. The next step in the development of the bearing was the introduction of replaceable bearings. These were thick bronze backed, Babbitt lined bearings. The next important step was the use of the thin steel-backed Babbitt lined bearing. In this bearing, both the back and bearing lining was thinner. This design gave a flexible bearing, and consequently the life of the bearing was greatly lengthened.

The design I now propose is a step still further in the direction of making a still more flexible bearing. I have found that by reducing the thickness of the bearing material in the bearing to a minimum practical amount, the flexibility of the bearing is increased, permitting it to more readily flex under the forces to which it is subjected to in operation with less detrimental effect therefrom than in the type of bearing constructions heretofore suggested. At the same time, by employing a minimum thickness of bearing material, there is less tendency for the bearing material to pound out in service and results in a bearing having a greater average length of life than in conventional types of bearings employing a relatively thicker layer of bearing material. Also, the thinner the material, the more readily will heat be conducted through it. The bearing material actually employed in connection with such bearings may be of the usual or suitable type of babbitt but it may also be constructed of any suitable bearing material such as silver or its alloys, cadmium or its alloys, or other suitable or conventional material.

Bearings, namely shell bearings of the type herein under discussion, are conventionally formed by providing a steel or other relatively rigid and shape maintaining backing member to which a suitable layer of bearing material is affixed. The conventional method of securing the layer of bearing material to the steel backing member is to tin the steel backing member and thereafter apply the bearing material to the tinned surface of the backing member. While tin provides a satisfactory initial bond between such bearing material and the steel backing member, the effectiveness of the bond is adversely affected by high speeds and high temperature operating conditions.

Therefore, because a thin bearing material is more resistant to pressure, flexing, and a better conductor of heat, than a thicker lining of the same material, it is obviously desirable to use the thinner lining. However, certain difficulties arise in the use of a thin bearing lining. One of these being the difficulty of manufacturing them. Inasmuch as this design calls for a very thin lining, it is difficult to prevent the final machining operation from going through the very thin babbitt. As this operation calls for the use of very accurate and expensive broaching tools, it is essential that these tools do not contact the hard steel. Having the broach run into the steel would ruin both the broach and the bearing. It is for this reason that a copper or copper alloy intermediate layer is employed to prevent the destruction of tools in manufacturing, and to act as a secondary or temporary bearing in case of failure of the Babbitt lining. Another important difficulty of using the thin lining is in the event of failure of the bearing in the motor. When such a thin lining should fail, the steel backing would immediately come into contact with the shaft and would soon seize, ruining the engine, whereas a thicker layer of babbitt would have greater clearance from the shaft and would not seize so readily as the thinner lining.

I have found that by providing a copper or a copper alloy bond between the steel backing member and the layer of bearing material, a much more satisfactory and more efficient bond is provided between these parts and one that is affected little if any by high operating speeds and temperatures. Copper or its alloys is particularly applicable for this use as it has a higher melting point and tensile strength than the bearing material and is more yieldable and resilient than the backing member, and particularly when used in conjunction with a layer of bearing material of minimum thickness aids in preventing the occurrence of localized hot spots on the surface of the bearing because of its high co-efficient of heat conductivity. Furthermore, it is well known that copper has a modulus of elasticity greater than that of the Babbitt bearing metal, for example, and a coefficient of thermal expansion greater than that of the steel backing metal, whereby when the bearing shell is heated in service a substantial thermostatic force inherently results, tending to press the bearing away from its associated shaft and into its seat.

This is particularly important as the Babbitt metal is greatly affected by heat, the crystals increase in size and the metal loses its strength, eventually causing failure. Furthermore, the use of copper or its alloys is usually more economical than the use of tin or its alloys. Copper and its alloys are vastly more superior than tin particularly where the layer thereof is relatively thick as in accordance with the present invention, in that it aids in absorbing some of the shock to which the bearing is subjected in service and helps prevent hammering out of the bearing material.

Referring now to the accompanying drawing, the present invention is shown, as a matter of illustration, in connection with a connecting rod for an internal combustion engine, the lower or big end portion of which connecting rod only is shown. This connecting rod includes the usual rod or strut portion 10 having a big end indicated generally at 12 provided with a central cylindrical bore 14. The big end 12 is split axially through the bore 14 to provide a conventional cap 16 secured to the main portion of the rod in conventional manner by means of bolts 18 and nuts 20. The usual type of adjusting shims 22 may be provided between the cap 16 and the cooperating portion of the connecting rod.

Received within the bore 14 and securely clamped therein by means of the cap 16 drawn up against the main body portion of the rod by the bolts 18 and nuts 20 is a shell type bearing composed of two semi-cylindrical shell portions indicated generally at 24. The two bearing halves 24 are arranged with their opposed edges in abutting relation and cooperate to form a completely cylindrical bearing. It is to be understood that the relative thickness of the various parts of the bearing as illustrated in the drawing is exaggerated for the purpose of illustration only. It will also be understood that the present invention is applicable to bearings of full cylindrical or unsplit construction, and to bearings in which the bearing material is applied to both the inner and outer faces thereof, to the outer face only, or to the inner face only, this latter type being shown by way of illustration as it is the most commonly used type.

As best illustrated in Fig. 3, each shell or bearing half comprises a semi-cylindrical backing member 26 comprising a more or less rigid and shape maintaining portion of the bearing. It is preferably made from steel, this primarily for the purpose of economy and satisfactory performance in service. To the inner surface thereof the backing member 26 has affixed thereto a layer 28 which according to the practice of the present invention is preferably copper or a copper alloy and is preferably of substantially constant thickness over its entire area. The exposed surface of the layer 28 has suitably fixed thereto a third layer 30 of material providing satisfactory bearing qualities and forming the bearing surface proper of the bearing. As previously mentioned the layer 30 may be formed from any suitable or conventional Babbitt material commonly employed for bearing purposes, although it may also be constructed of any other suitable bearing material such as silver or its alloys, cadmium or its alloys, or other suitable or conventional material.

In practice, the effective diameter of the halves 24 when in free state is preferably slightly greater than the diameter of the bore 14 so that preferably, as illustrated in Fig. 4, the halves 24 may not simply be dropped into the corresponding half of the bore 14 of the rod but the free edges thereof must be sprung towards each other a slight amount in order to enable the bearing half 24 to be snapped into position in its corresponding half of the bore 14. This practice is desirable in order to insure a relatively tight fit between the outer surface of each bearing half 24 and the cooperating walls of the bore 14, thereby eliminating any spacing of the outer surface of the bearing shell halves 24 from the surface of the bore 14 which would permit the bearings to yield in service. The relative circumferential dimensions of each half 24 are such that when the bearing cap 16 is pulled tightly into place as illustrated in Fig. 1 the opposed edges of the halves 24 abut to cause the halves 24 to be firmly expanded into contact with the surface of the bore 14.

In accordance with the present invention the thickness of the layer 30 of bearing material in a finished bearing is preferably from 0.001" to 0.005", and preferably approximately 0.0025", for a bearing having a two inch bore therein. For such limits of thickness of the layer 30 of bearing material, the intermediate layer 28 must be at least twice as thick as and is preferably about four times thicker than the layer of bearing material 30 and in the instance given is preferably between 0.005" and 0.015", and preferably is approximately 0.010" in thickness. The thickness of the steel backing member 26 should be at least twice as thick as and is preferably about four times thicker than the intermediate layer 28 and in the particular instance given should be from 0.030" to 0.080" and preferably in the neighborhood of 0.040". With the proportions specified it is obviously possible to provide a composite bearing shell having a total wall thickness not in excess of .110".

It is essential that the intermediate layer 28 be firmly adhered to the backing layer 26 not only to prevent possible creep of the layer 28 with respect to the layer 26 and to lessen the tendency of the layer 28 to pound out under the forces experienced in service, but also to provide a bond which will efficiently and quickly transfer heat absorbed by the intermediate layer 28 to the backing layer 26 there to be absorbed through contact with the walls of the bore 14 by the big end of the connecting rod. While such bond between the intermediate layer 28 and the backing layer 26 may be provided in any suitable or conventional manner, I have found it particularly desirable both from the quality of the bond so obtained and from the standpoint of uniformity of thickness in the layer 28 and economy in production to apply the layer 28 to the backing member 26 by means of an electrolytic process, in other words by a plating process. Likewise the layer 30 of bearing material may be applied to the intermediate layer 28 in any suitable or conventional manner, such as for instance as by a tinning or dipping process, electrolytic plating process, or the like. Thus, the metals comprising the bearing shell are manifestly integrally bonded at their contacting faces.

It might also be mentioned that for the purpose of economy and ease in manufacture, the bearing halves 24 are preferably formed by plating the intermediate layer 28 upon relatively long strips of steel conforming to the width of the bearing and of the desired thickness in the final product, and while the strips are still in the described long length, applying the layer 30 of bearing material thereto, after which such strips may be cut into suitable lengths, bent into semi-cylindrical shape, such as that described in connection with Fig. 4, the edges and the end portions thereof suitably machined, and the inner and outer peripheral surfaces, or at least one thereof, machined to bring the individual bearing halves into their final form.

As has been previously mentioned, in actual service and particularly under conditions of high speed engine operation, the forces to which the big end of a connecting rod is subjected is such as to cause an actual distortion of the true cylindrical form of the bore 14, and of the bearing contained therein, the distortion occurring as an elongation of that diameter of the bore aligned with the longitudinal axis of the corresponding connecting rod. This distortion of the big end of the connecting rod naturally causes a corresponding distortion of the bearing therein and causes the bearing halves to repeatedly flex about a line approximately midway between their free side edge portions and parallel to the axis of the bore 14. I have found that by employing a layer 30 of bearing material of the small dimensions specified and supporting it upon a thicker layer of intermediate material having high heat conductivity, higher melting point and tensile strength than the bearing material itself but yet of a softer character and more yieldable than the material from which the backing member 26 is formed, the character of the entire bearing is such as to withstand these repeated flexings without rupturing of the bearing material and without causing the same to become pounded out in service. Moreover, because of the high co-efficient of heat conductivity of the intermediate layer 28, should there be any tendency towards the occurrence of localized hot spots on the surface of the bearing in service, the heat is rapidly transferred away from such localized area by the intermediate layer and distributed thereby more or less uniformly to the entire area of the backing member 26. This feature aids in preventing burning out of the bearing at temperatures which conventional bearings could not withstand. Furthermore, should for any reason the layer 30 of bearing material become burned out or worn through, the cooperating crank pin will, in such case, contact directly the intermediate layer 28 which being of copper or its alloys will serve successfully as a temporary bearing until the damage may be discovered and repaired. It will be appreciated that in event the bearing material 30 is actually burned out for any reason whatever, its extremely small thickness will not permit sufficient pounding between the bearing and the cooperating crank pin to cause serious damage to the engine before repair can be conveniently effected.

It will also be appreciated that because of the relatively great thickness of the intermediate layer 28 and because of its character, should a tool, while machining the active surface of the layer 30 of bearing material, for any reason or other break through the layer of bearing material and dig into the intermediate layer 28, no substantial damage to the tool will occur such as would otherwise occur should the tool contact directly with the steel backing member 26 and as might occur in connection with conventional constructions where the layer of bearing material is simply tinned to the backing member.

From the above it will be appreciated that the present invention provides a replaceable shell type bearing possessed of a relatively great degree of flexibility, with maximum resistance to both burning and pounding out in service, that is such as to enable substantial damage to the cooperating engine to be prevented should the bearing become burned out in service, and that because of its character not only is economical to manufacture but particularly lends itself to obvious economies in manufacture.

Formal changes may be made in the specific embodiment of the invention described without departing from the spirit or substance of the broad invention, the scope of which is commensurate with the appended claims.

What is claimed is:

1. A shell type bearing comprising a relatively heavy generally semi-cylindrical steel backing member having a non-ferrous highly heat conducting metallic layer bonded to the interior surface thereof and a coating of bearing metal bonded to the interior surface of said heat conducting layer, said bearing metal coating being of sufficient thickness to provide a bearing surface and being of a thickness less than .005 of an inch.

2. A shell type bearing comprising a relatively heavy generally semi-cylindrical steel backing member having a non-ferrous highly heat conducting metallic layer bonded to the interior surface thereof and a coating of bearing metal bonded to the interior surface of said heat conducting layer, said bearing metal layer consisting primarily of lead and having a thickness of about .001 of an inch.

3. A shell type bearing comprising a steel backing member having electrodeposited thereon a layer of a highly heat conducting relatively ductile non-ferrous metal of a thickness not less than .010 of an inch and an electrodeposited bearing metal layer intimately bonded to the surface of said non-ferrous layer, said last-mentioned layer having a thickness of approximately .001 of an inch.

4. A bearing consisting of a steel back, a layer of intermediate metal and a layer of soft bearing metal approximately .001 to .005 inch thick, the metals being integrally bonded at their contacting faces, the intermediate metal being at least two to four times as thick as the bearing metal and not less than one-fourth to one-half as thick as the backing metal and having a modulus of elasticity greater than that of the bearing metal and a coefficient of thermal expansion greater than that of the backing metal.

5. A bearing having a total wall thickness not in excess of .110 inch and consisting of a steel back, a layer of intermediate metal and a layer of soft bearing metal approximately .001 to .005 inch thick, the metals being integrally bonded at their contacting surfaces, the intermediate metal being at least one-fourth to one-half as thick as the steel backing member and having a modulus of elasticity greater than that of the bearing metal and a coefficient of thermal expansion greater than that of the backing metal.

6. A thin walled half bearing shell consisting of a steel back, a layer of intermediate metal and a layer of soft bearing metal approximately .001 to .005 inch thick, the metals being integrally bonded at their contacting surfaces, the intermediate metal being at least one-fourth to one-half as thick as the steel backing member, and having a modulus of elasticity greater than that of the bearing metal and a coefficient of thermal expansion greater than that of the backing metal, whereby when the bearing is heated in service, a substantial thermostatic force results tending to press the bearing away from the shaft and into its seat.

7. A bearing element comprising a relatively heavy steel backing member having a non-ferrous, highly heat conducting metallic layer bonded to the surface thereof and a coating of bearing metal bonded to the surface of said heat conducting layer, said bearing metal coating being of sufficient thickness to provide a bearing surface and being of a thickness less than .005 of an inch.

WILLIAM HAROLD BAGLEY, Jr.